Sept. 20, 1932.   S. R. ZIMMERMAN   1,878,059
VEHICLE JACK
Filed Nov. 14, 1929
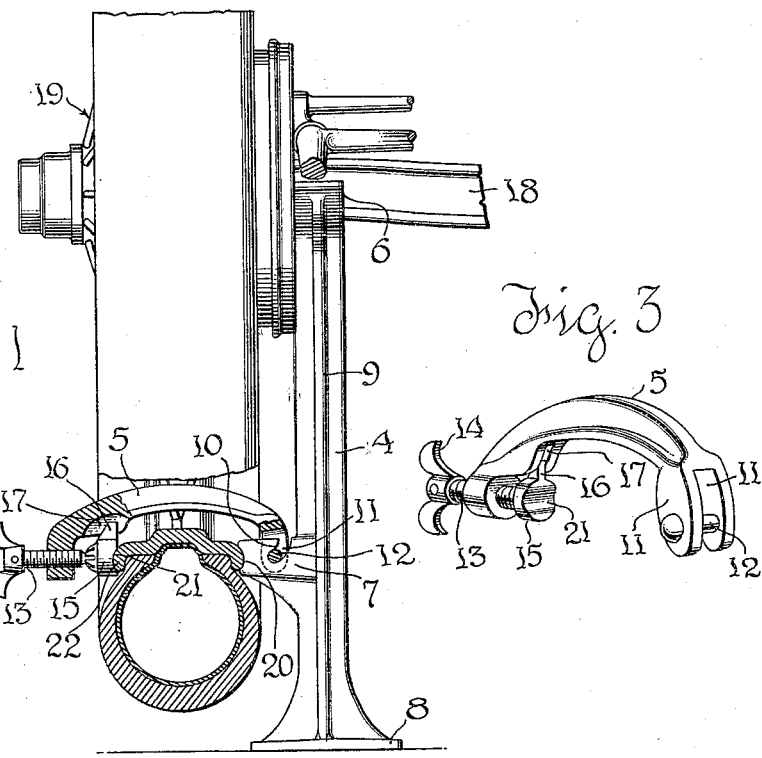
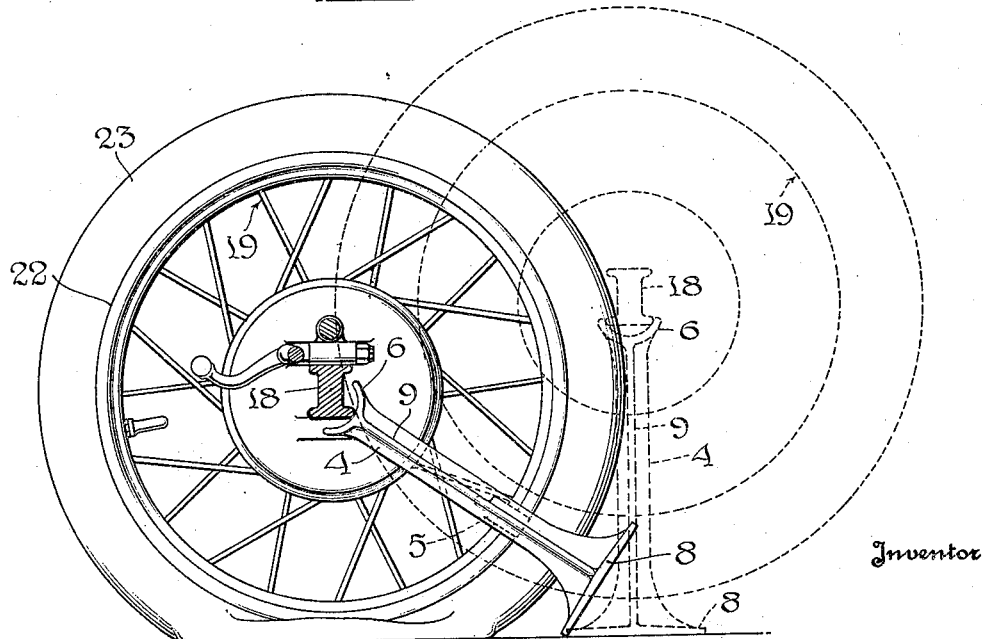

Patented Sept. 20, 1932

1,878,059

UNITED STATES PATENT OFFICE

SAMUEL R. ZIMMERMAN, OF GREENVILLE, SOUTH CAROLINA

VEHICLE JACK

Application filed November 14, 1929. Serial No. 407,202.

This invention relates to vehicle jacks of the type in which the lifting operation is performed by movement of the vehicle to be lifted. More particularly the invention concerns itself with a jack capable of use with a vehicle having demountable wheels.

It is known in the prior art that vehicles may be lifted by jacks of the character above mentioned, but such devices are either permanently attached to the vehicle chassis or are secured to the vehicle wheel. The first type is impractical and expensive because it requires that each vehicle be equipped with four separate jacks and that mechanism be provided for raising and holding the jacks in inoperative position, and yet permitting them to be released easily when desired. The second type cannot be used with demountable wheels because the vehicle is supported by the felly or the spokes of the wheel to which the jack is attaced.

If a self-lifting jack is to be used with vehicles having demountable wheels, it is essential then that it support the vehicle by means of the vehicle axles; be capable of easy and quick attachment and yet be readily detachable after use. The main object of my invention is to provide a jack of this character which is simple, inexpensive and practical.

Other objects will appear from the following description when read in connection with the accompanying drawing in which:

Fig. 1 is a view, partly in section, of one embodiment of my invention as applied to a vehicle having demountable wheels.

Fig. 2 is an elevation showing the manner of using the jack.

Fig. 3 is a perspective view of a clamping member which forms a part of the jack.

Referring to the drawing the jack in question comprises an upright member 4, and a clamping or rim-embracing member 5. These members may be made from any suitable material such as malleable iron or steel, and member 4 comprises a body portion having a cup-like axle-engaging top 6, an intermediate lug 7 and an enlarged base 8. The body portion may be provided with reinforcing ribs 9 so as to make it strong without unduly increasing its weight. With the top 6 constructed as shown, the lug 7 is prevented from turning and is therefore held in substantially parallel relation to the vehicle axle during the placing of the jack and the lifting of the vehicle.

As shown in the drawing the lug 7 is formed integrally with the member 4, and is shaped at 20 to conform to the curvature of a side face of the rim of a vehicle wheel. In its top side it contains an undercut slot 10, adapted to receive and pivotally support the member 5.

Operative association of the upright member 4 and the vehicle wheel, is obtained by means of the arcuate rim-embracing member 5. At its inner end of the member 5 is bifurcated to form two legs 11, joined adjacent their free ends by a pivot pin 12. Threaded into the outer end of member 5 is a clamp which may comprise a threaded shank 13, a winged nut 14 secured thereto, and a block 15. Block 15 is pivotally attached to the inner end of shank 13 and carries an integral tongue 16. The face 21 of block 15 is shaped to conform to the curvature of a side face of the rim of a vehicle wheel, and is held in proper relation to the rim by the cooperation of tongue 16 and a groove 17 in the member 5.

In Fig. 1 the cup-like top 6 of the jack is shown in engagement with the front axle 18 of an automotive vehicle of well known construction, the wheel 19 being lifted from the ground for removal or replacement. It will be seen that the rim 22 of the wheel is securely held between the block 15 and the lug 7 so that movement of the axle 18 will cause the wheel and the jack to be moved at the same time.

The method of applying the jack and lifting a wheel is clearly illustrated in Fig. 2, the wheel 19 being shown with a flat tire 23. The member 5 is normally removed from the upright member 4, for convenience in carrying the jack. When a wheel is to be jacked up, the member 4 is placed in position with the top 6 against the vehicle axle, and the edge of the base 8 resting on the ground. Preferably the member 4 is placed in front of the axle in lifting a front wheel, and in rear of the axle in lifting a rear wheel thereby avoiding reaching under the car. The member 4 is, of course, placed inwardly of the wheel, then the member 5 is inserted between the spokes of the wheel and the pin 12 placed in the slot 10. The nut 14 is tightened until the rim 22 is securely held between lug 7 and block 15, the surfaces 20 and 21 engaging the sides of rim 22. Proper alignment of block 15 and the side of rim 22 is assured by the action of tongue 16 and groove 17.

The vehicle is now driven forward until member 4 reaches a vertical position, as shown by the dotted lines in Fig. 2, in which position the wheel is elevated above the ground. With the vehicle brake set to hold the vehicle in position, the member 5 can be removed to allow the wheel to be taken off and another substituted. When this wheel or another wheel is placed on the hub and secured in place, the member 5 is again inserted, hooked into the slot 10 and clamped to the rim 22. The vehicle is now driven forward or backward until the weight of the vehicle is entirely removed from the jack and is again supported by the wheel. After this the parts 4 and 5 may be separated and removed from the wheel and axle.

It will be clear that, although my invention has been illustrated as applied to a vehicle using demountable wheels, its use is not so limited. The jack may be applied either in front of or in rear of either axle, and the vehicle raised or lowered by moving the vehicle either forward or backward, as convenience may dictate. By making the member 5 removable from the member 4, storing, carrying, assembly and disassembly of the jack are greatly simplified.

Although I have herein shown and described only one form of jack embodying my invention it will be obvious that various changes and modifications may be made in the details thereof, within the scope of the appended claims, without departing from the spirit and scope of my invention.

What is claimed is:

1. A vehicle jack comprising an upright member having an axle-engaging portion at the top and an enlarged base; an intermediate lug carried by said member; and a rim-embracing member pivotally attached to said lug.

2. A vehicle jack comprising an upright member having an axle-engaging portion at the top and an enlarged base; an intermediate lug carried by said member; a detachable rim-embracing member pivoted on said lug; and clamping means carried by said rim-embracing member at the free end thereof.

3. A vehicle jack comprising an arcuate member adapted to be secured to the rim of a vehicle wheel; clamping means carried by said member; an upright support having an axle-engaging portion at the top and an enlarged base; and a lug carried by said upright member, said lug providing a pivot about which said arcuate member is detachably swingable.

4. A vehicle jack comprising an arcuate member adapted to be secured to the rim of a vehicle wheel; clamping means carried by said member; an upright support having an axle-engaging portion at the top and an enlarged base; a lug carried by said upright member substantially midway between the ends of said member, said lug having an undercut slot in its top side for receiving and pivotally supporting one end of said arcuate member.

5. A vehicle jack comprising an arcuate member adapted to be secured to the rim of a vehicle wheel, said member having one end bifurcated and the bifurcations being joined by a pivot pin; a clamp carried by the other end of said member, said clamp including a projecting tongue and said member having a groove cooperating with said tongue to maintain said clamp in predetermined relation to the member; an upright member having an axle-engaging portion and a base; and a lug on said upright member, said lug having an undercut slot to receive the pivot pin on said arcuate member and support said arcuate member in detachable pivotal relation to said upright member.

In testimony whereof I have signed my name to this specification.

SAMUEL R. ZIMMERMAN.